(12) United States Patent
Dhall

(10) Patent No.: US 11,726,678 B2
(45) Date of Patent: Aug. 15, 2023

(54) CONFIGURABLE SOLID STATE DRIVE WITH MULTIPLE FORM FACTORS

(71) Applicant: Micron Technology, Inc., Boise, ID (US)

(72) Inventor: Dheeraj Dhall, Kota (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/394,009

(22) Filed: Aug. 4, 2021

(65) Prior Publication Data
US 2023/0042673 A1 Feb. 9, 2023

(51) Int. Cl.
*G06F 3/06* (2006.01)
*G06F 1/18* (2006.01)

(52) U.S. Cl.
CPC ............ *G06F 3/0626* (2013.01); *G06F 1/187* (2013.01); *G06F 3/0607* (2013.01); *G06F 3/0619* (2013.01); *G06F 3/0631* (2013.01); *G06F 3/0659* (2013.01); *G06F 3/0688* (2013.01)

(58) Field of Classification Search
CPC ...... G06F 3/0626; G06F 1/187; G06F 3/0607; G06F 3/0619; G06F 3/0631; G06F 3/0659; G06F 3/0688
See application file for complete search history.

(56) References Cited

U.S. PATENT DOCUMENTS

| | | | |
|---|---|---|---|
| 10,545,901 B2 * | 1/2020 | Seiler .................. | G06F 13/1678 |
| 10,922,260 B2 | 2/2021 | Heyd et al. | |
| 10,990,553 B2 | 4/2021 | Rust et al. | |
| 2010/0296236 A1 * | 11/2010 | Schuette .............. | G06F 3/0658 |
| | | | 29/829 |
| 2011/0035813 A1 * | 2/2011 | Trantham ............. | H04L 9/0841 |
| | | | 380/278 |
| 2011/0167201 A1 * | 7/2011 | Huang ................... | G06F 1/187 |
| | | | 711/115 |
| 2017/0164501 A1 | 6/2017 | Killen et al. | |
| 2018/0329849 A1 * | 11/2018 | Hsu ..................... | G06F 13/4068 |
| 2019/0272249 A1 * | 9/2019 | Olarig ................. | G06F 13/4221 |

* cited by examiner

*Primary Examiner* — Eric Cardwell
(74) *Attorney, Agent, or Firm* — Brooks, Cameron & Huebsch, PLLC

(57) ABSTRACT

An apparatus which includes a first solid state drive (SSD) located on an SSD card having a fixed capacity and a first form factor. The apparatus can further include an adapter located on the SSD card to accommodate a second SSD. The second SSD has a second form factor that is different than the first form factor and is removeable from the SSD card. The apparatus can further include a controller located on the SSD card and configured to access the first SSD and the second SSD.

18 Claims, 4 Drawing Sheets

CONFIGURABLE SOLID STATE DRIVE WITH MULTIPLE FORM FACTORS

TECHNICAL FIELD

The present disclosure relates generally to memory sub-systems, and more particularly, to a configurable solid state drive with multiple form factors.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices. A memory sub-system can be a storage system, such as a solid-state drive (SSD).

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
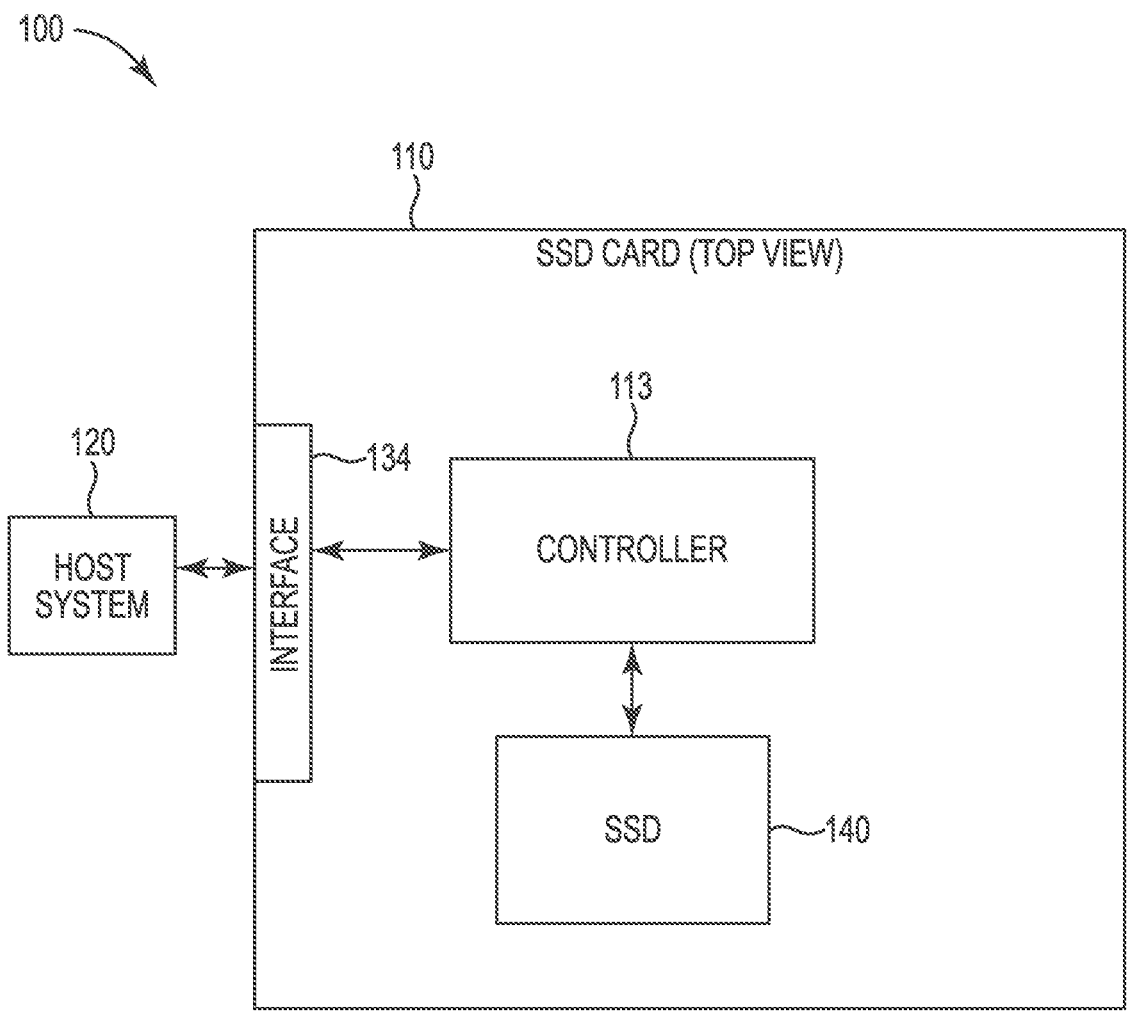
FIG. 1A illustrates an example computing environment that includes an SSD card memory sub-system in accordance with some embodiments of the present disclosure.

Aspects of the present disclosure are directed to a configurable solid state drive with multiple form factors. In general, a host system can utilize a memory sub-system to store data and to retrieve data from memory devices. The memory sub-system can include a controller that can manage the memory components and allocate data to be stored at the memory components. The memory components can, for example, include volatile memory components and non-volatile memory components. A memory sub-system can be a storage system, such as a solid-state drive (SSD).

SSDs can have different physical form factors and storage capacities. As an example, various SSDs are a half height, half length (HHHL) or full height, half length (FHHL) form factor drives having a fixed storage capacity (e.g., 512 GB, 1 TB, etc.). Traditionally, the storage capacity of HHHL and/or FHHL drives is fixed such that it cannot be increased (e.g., by a customer). Such SSDs can also be expensive, which can make replacing the drive with a higher capacity drive cost prohibitive. Some SSD cards, such as Boot Optimized Storage Solution (BOSS) cards, can include one or more slots for SSDs having form factors such as M.2 or mSATA that can be removed from the card, which itself may have an HHHL or FHHL form factor and PCIe physical interface to a host. BOSS cards can support capabilities such as RAID (redundant array of independent disks) and importing foreign configurations, which are often not supported by conventional fixed capacity SSDs.

Traditionally, customers have to choose between storage capacity benefits of a conventional fixed capacity SSD (e.g., HHHL and FHHL drives) and the capability and portability benefits of removable SSDs having form factors such as M.2, U.2, and mSATA, for example.

Aspects of the present disclosure address the above, and other deficiencies, by providing an SSD card having a configurable capacity and capability. In various embodiments, the SSD card can be an adapter printed circuit board (PCB) that includes a fixed capacity SSD and a number of adapters that can accommodate a number of additional removable SSDs. The SSD card can be sold with or without the removable SSDs attached, which allows the customer to adjust (e.g., increase) the storage capacity of the card as desired. The removable SSDs can be attached via the adapters in order to add particular capabilities such as RAID and/or foreign configuration importing that may not be provided by the fixed capacity drive. The SSD card can have a physical interface such as a PCIe interface through which a host can access any of the SSDs (e.g., the SSDs having different form factors) on the card. Accordingly, the SSD card can occupy a single adapter slot (e.g., a single PCIe slot) within a system and through which the multiple SSDs of the SSD card can be accessed (e.g., by a host processor). The controller of the SSD card can be configured to drive the different form factor SSDs of the card via appropriate protocols such as NVMe or SATA protocols. In some embodiments, the adapters can use different interfaces, however the adapters will use the same protocols. The combination of the removeable SSD(s) and the fixed capacity SSD can improve power handling, cost effectiveness, and performance as compared to prior SSD card solutions. Additionally, the multiple SSDs on the card can be accessed (by a host) via a single physical interface (e.g., a single physical PCIe slot), which can avoid using multiple physical slots for multiple SSDs.

Figure 1B:
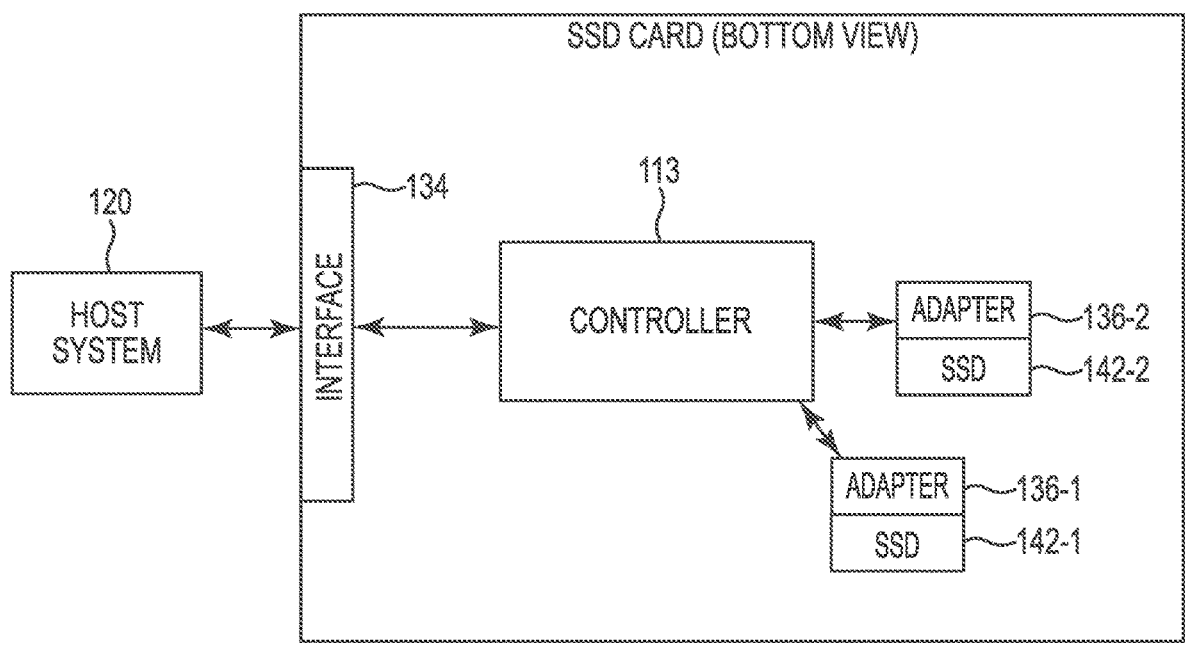
FIG. 1B illustrates an example computing environment that includes an SSD card memory sub-system in accordance with some embodiments of the present disclosure.

FIGS. 1A and 1B illustrate an example computing environment 100 that includes an SSD card memory sub-system 110 in accordance with some embodiments of the present disclosure. In this example, FIG. 1A illustrates a first side (e.g., top side) of an SSD card 110, and FIG. 1B illustrates a second side (e.g., bottom side) of the SSD card 110.

The computing environment 100 can include a host system 120 that is coupled to one or more memory sub-systems 110. In some embodiments, the host system 120 is coupled to different types of memory sub-systems. For example, host system 120 can be coupled to other memory sub-systems 110, which may include flash drives, embedded Multi-Media Controller (eMMC) drives, Universal Flash Storage (UFS) drives, hard disk drives (HDDs), dual in-line memory modules (DIMMs), etc. The host system 120 uses the memory sub-system, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, Internet of Things (IoT) enabled device, or such computing device that includes a memory and a processing device. The host 120 can be coupled to the memory sub-system 110 via a physical host interface 134.

Examples of a physical host interface 134 include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical interface 134 can be used to transmit data between the host system 120 and the memory sub-system 110 (e.g., SSD card 110).

In the example shown in FIGS. 1A and 1B, the memory sub-system 110 is an SSD card 110. The SSD card 110 can be a printed circuit board (PCB) that includes an SSD 140 located on a first side (e.g., top side or front side). A controller 113, which may be referred to as a sub-system controller, is coupled to the SSD 140 and configured to perform operations such as reading data, writing data, or erasing data at the memory devices (not shown) of the SSD 140. As described further herein, the SSD 140 is not removable from the SSD card 110, has a fixed storage capacity (e.g., 512 GB, 1 TB, etc.), and a particular form factor such as HHHL or FHHL typically associated with non-removable form factors.

As shown in FIG. 1B, the SSD card 110 also includes a number of adapters (e.g., 136-1 and 136-2) that can be used to accommodate a number of additional SSDs (e.g., 142-1 and 142-1) on the SSD card 110. As described further herein, the additional SSDs 142-1 and 142-2 can have a different form factor from that of the SSD 140 and can be removable from the SSD card 110. Such different form factors can include M.2, U.2, and mSATA, among others. The removability of the SSDs 142-1 and 142-2 from the SSD card 110 can provide various benefits. For example, the SSD card 110 can be sold to customers with or without the removable SSDs 142-1/142-2 depending on the storage capacity needs of the customer. That is, the SSDs 142-1/142-2 can be added in the field in order to dynamically adjust (e.g., increase) the storage capacity of the card 110 and/or to swap out a failing one or more of the removable SSDs 142-1/142-2.

The controller 113 can be configured to perform operations on the SSDs 142-1 and 142-2 as well as the SSD 140 even though the SSDs have different form factors and capabilities. The controller 113 can communicate with the SSDs 142-1 and 142-2 via the adapters 136-1 and 136-2, which can be physical PCIe adapters configured to connect to the physical interfaces of the respective SSDs 142-1 and 142-2 using a particular protocol such as NVMe or SATA. Although the adapters 136-1 and 136-2 can use different physical interfaces 142-1 and 142-2, the adapters 136-1 and 136-2 will use the same protocols. The controller 113 can include hardware such as one or more integrated circuits and/or discrete components, a buffer memory, or a combination thereof. For example, the controller 113 can be a microcontroller, special purpose logic circuitry (e.g., a field programmable gate array (FPGA), an application specific integrated circuit (ASIC), etc.), or other suitable processing circuitry (e.g., processor). In general, the controller 113 can receive commands or operations from the host system 120 and can convert the commands or operations into instructions or commands to achieve the desired access to the memory devices of the SSDs 140, 142-1, 142-2. The memory devices of the SSDs 140, 142-1, 142-2 can include various combinations of different types of non-volatile and/or volatile memory devices including, but not limited to NAND flash devices, DRAM devices, phase change memory (PCM) devices, ferroelectric random access memory (FeRAM) devices, etc.

The controller 113 can include a processing device configured to execute instructions stored in local memory (not shown). The local memory of the controller 113 can include an embedded memory configured to store instructions for performing various processes, operations, logic flows, and/or routines that control operation of the SSD card 110, including handling communications between the fixed SSD 140 and the removeable SSDs 142-1 and 142-2 and/or communications between the SSD card 110 and a host 120. In various embodiments, the removable SSDs 142-1 and 142-2 may provide capabilities not provided by the non-removable SSD 140. In such embodiments, the controller 113 is configured (e.g., programmed) to support the additional capabilities/functions of the removable SSDs 142-1 and 142-2 when they are mounted to the SSD card 110 via adapters 136-1 and 136-2. The adapters 136-1 and 136-2 can resist rough usage condition for insertion of the removable SSDs 142-1 and 142-2. As an example, in a number of embodiments, the SSD card 110 might not support RAID capability; however, the addition of one or more of the removable SSDs 142-1 and 142-2 may provide such RAID capability for the SSD card 110. Other capabilities that mounting of the removable SSDs 142-1 and 142-2 may provide to the SSD card 110 include, but are not limited to, foreign configuration import capability and data mirroring of the SSD 140 on the SSDs 142-1 and 142-2. Therefore, in various embodiments, the single controller 113 can be configured to support such additional SSD card capabilities should the removable SSDs 142-1 and/or 142-2 be added to the SSD card 110.

The controller 113 can also be responsible for various media management operations such as wear leveling operations, garbage collection operations, error detection and error-correcting code (ECC) operations, encryption operations, caching operations, and/or address translations between a logical block address and a physical block address.

While the example SSD card 110 shown in FIG. 1A has been illustrated as including the controller 113, in other embodiments of the present disclosure an SSD card 110 may not include a controller 113 and can instead rely upon external control. Such external control can, in a number of embodiments, be provided by an external host (e.g., 120) and/or by a processor or controller separate from the SSD card 110.

Although illustrated as separate adapters 136-1 and 136-2 in FIG. 1B, in some embodiments, the adapter can be a single adapter to accommodate a single removable SSD 142-1/142-2. In some embodiments, the adapter can be a single adapter having multiple slots (e.g., PCIe slots). Additionally, embodiments are not limited to a particular quantity of adapters. For example, an SSD card 110 can include more or fewer than two adapters 136-1 and 136-2.

Figure 2:
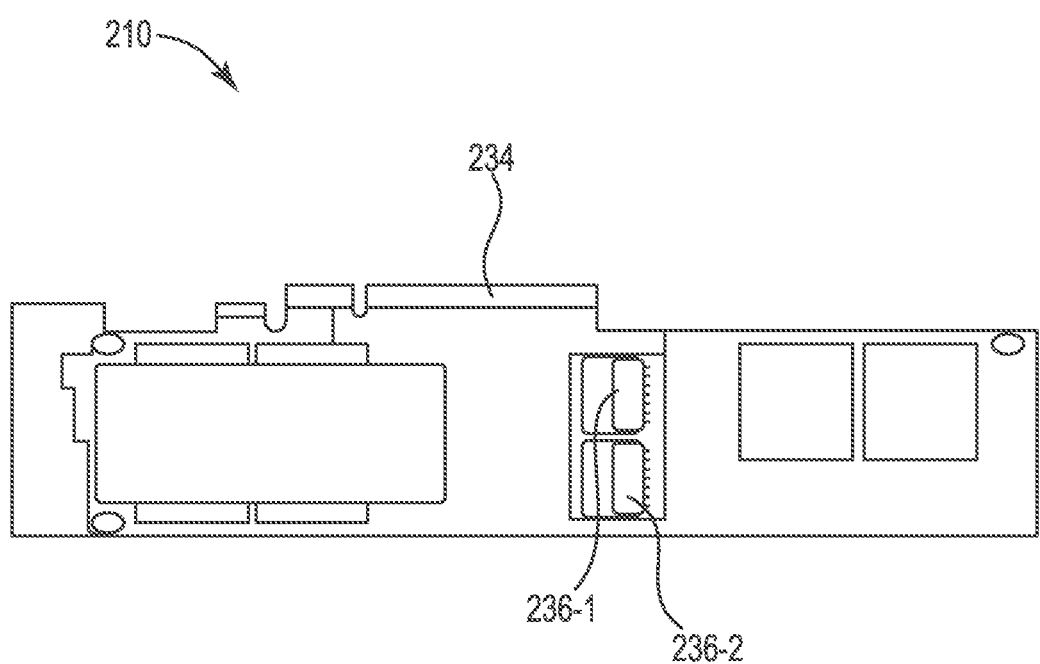
FIG. 2 illustrates an example SSD card in accordance with some embodiments of the present disclosure.

FIG. 2 illustrates an example memory subsystem adapter card 210 in accordance with some embodiments of the present disclosure. In this example, the adapter card is an SSD card 210 that includes a fixed capacity SSD (not shown in FIG. 2), a physical interface 234 to connect to a host (e.g., host 120), and a number of adapters (e.g., 236-1 and 236-2) to which additional (e.g., removable) SSDs (not shown in FIG. 2) can be coupled. The removable SSDs can be SSDs such as 142-1 and 142-2 described in FIG. 1 and can be added to SSD card 210 to increase the storage capacity of the SSD card 210 and/or to increase the capability of the SSD card 210 as described above. In a number of embodiments, the fixed capacity SSD (e.g., 140) is located on the opposite side of the SSD card 210; however, portions of the fixed capacity SSD can also be located on the same side of the SSD card 210 as the adapters 236-1 and 236-2. Additionally, although the adapters 236-1 and 236-2 are shown on one side of the SSD card 210, embodiments are not so limited. For instance, one or more adapters to accommodate removable SSDs can be located on both sides of the SSD card 210.

The SSD card 210 can be a printed circuit board (PCB) having a particular form factor and a fixed capacity SSD thereon. In this example, the SSD card 210 has a half height, half length (HHHL) form factor with a PCIe x16 interface 234 (i.e., 16 data lanes); however, embodiments are not so limited. For example, the interface 234 can have other physical configurations such as a PCIe x8 interface. The interface 234 can be a PCIe or NVMe physical interface through which a host system (not shown) can access the fixed capacity SSD and the one or more removeable SSDs (e.g., through adapters 236-1 and 236-2). The adapters 236-1 and 236-2 can be configured to accommodate removable SSDs having various form factors such as M.2, U.2, or mSATA, among other form factors, and can support various protocols such as NVMe or SATA protocols, among others. Although the adapters 236-1 and 236-2 can use different physical interfaces, the adapters 236-1 and 236-2 will use the same protocols. In the example shown, the adapters 236-1 and 236-2 are designed to accommodate respective M.2 form factor SSDs; however, embodiments are not so limited.

Figure 3:
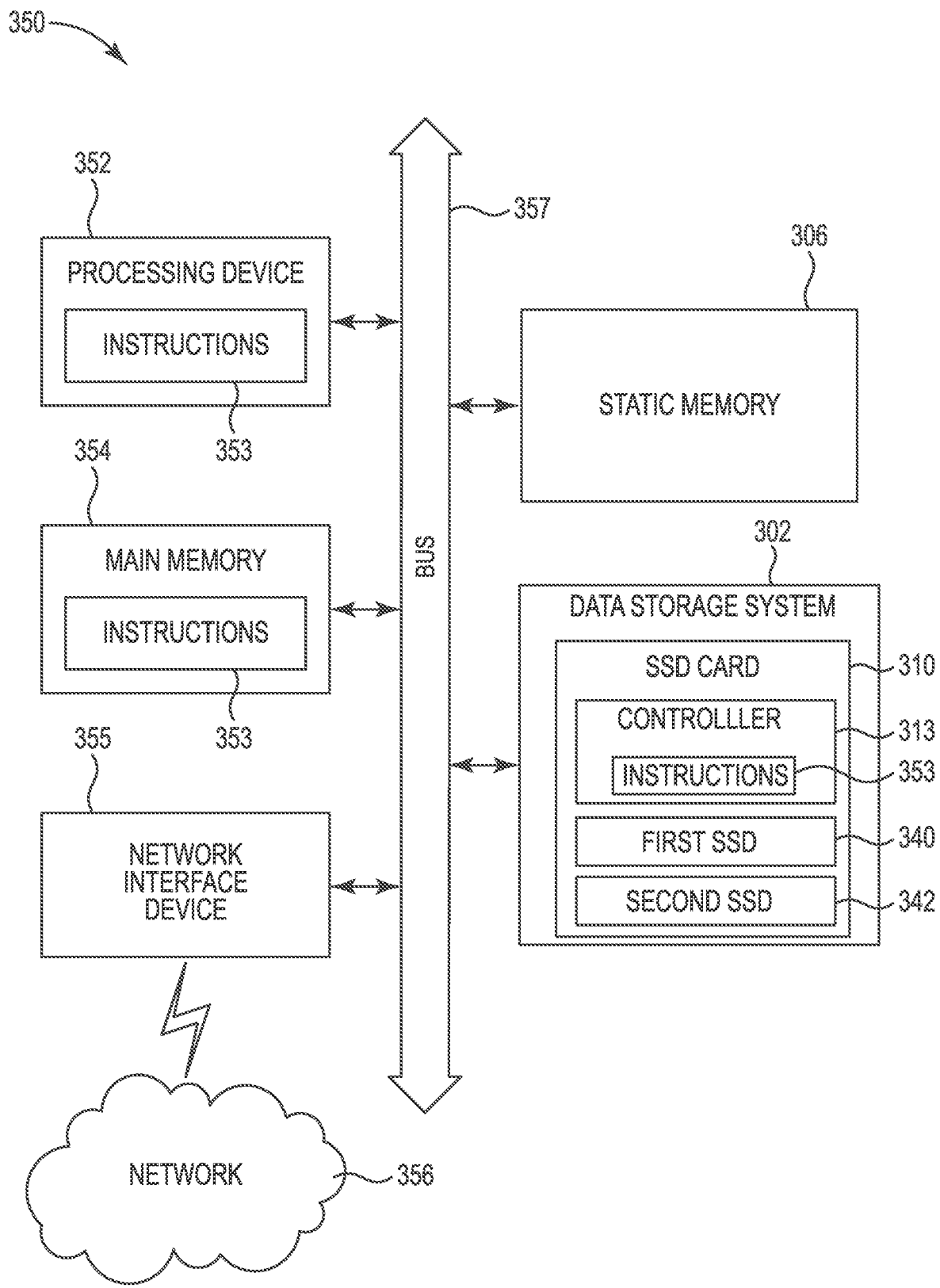
FIG. 3 is a block diagram of an example computer system in which embodiments of the present disclosure may operate.

FIG. 3 illustrates an example machine of a computer system 350 within which a set of instructions, for causing the machine to perform any one or more of the methodologies discussed herein, can be executed. In some embodiments, the computer system 350 can correspond to a host system (e.g., the host system 120 described in connection with FIG. 1A/1B) that includes, is coupled to, and/or utilizes a memory sub-system such as the SSD card 110 of FIGS. 1A and 1B. The computer system 350 can be used to execute operations of a controller. In a number of embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 350 includes a processing device 352, a main memory 354, a static memory 358, and a data storage system 302, which communicate with each other via a bus 357. The main memory 354 can, in a number of embodiments, be read-only memory (ROM), flash memory, dynamic random access memory (DRAM), such as synchronous DRAM (SDRAM) or Rambus DRAM (RDRAM), among other possibilities. The static memory 358 can, in a number of embodiments, be flash memory, static random access memory (SRAM), among other possibilities. The data storage system 302 can correspond to the SSD card 110, described in connection with FIGS. 1A and 1B.

Processing device 352 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 352 can also be one or more special-purpose processing devices such as an application specific integrated circuit (ASIC), a field programmable gate array (FPGA), a digital signal processor (DSP), network processor, or the like. The processing device 352 is configured to execute instructions 353 for performing the operations and steps discussed herein. The computer system 350 can further include a network interface device 355 to communicate over a network 356.

The data storage system 302 can include an SSD card 310 which includes a controller 313, on which is stored one or more sets of instructions 353 or software embodying any one or more of the methodologies or functions described herein, a first SSD 340 and a removeable SSD 342. The instructions 353 also can reside, completely or at least partially, within the main memory 354 and/or within the processing device 352 during execution thereof by the computer system 350. In a number of embodiments, the instructions 353 can include instructions to implement functionalities in connecting the fixed SSD form factor to the removeable SSD form factor. The main memory 354 and the processing device 352 also contribute to the machine-readable storage media. The machine-readable storage medium 359, data storage system 302, and/or main memory 354 can correspond to the memory sub-system 110 of FIG. 1A/1B.

Some portions of the preceding detailed descriptions have been presented in terms of algorithms and symbolic representations of operations on data values (bits) within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description herein. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable storage medium, such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a first solid state drive (SSD) located on an SSD card, wherein the first SSD is not removable from the SSD card, has a fixed capacity and a first form factor, such as a half height, half length (HHHL) form factor or a full height, half length (FHHL) form factor;
   an adapter located on the SSD card to accommodate a second SSD, wherein the adapter is separate from a physical interface through which both the first SSD and the second SSD can be accessed and the second SSD has a second form factor that is different than the first form factor and is removeable from the SSD card and wherein the second form factor is an M.2 form factor, a U.2 form factor, or an mSATA form factor; and
   a controller located on the SSD card and configured to access the first SSD and the second SSD.

2. The apparatus of claim 1, further comprising another adapter located on the SSD card to accommodate a third SSD, wherein the third SSD has a same form factor as the second SSD.

3. The apparatus of claim 2, wherein the SSD card has redundant array of independent disk (RAID) capability when the second SSD is coupled to the adapter and when the third SSD is connected to the another adapter.

4. The apparatus of claim 1, wherein the controller located on the SSD card is an application-specific integrated circuit (ASIC).

5. The apparatus of claim 1, wherein the adapter is a PCIe adapter coupled to a physical PCIe interface of the SSD card.

6. The apparatus of claim 1, wherein the apparatus is a server.

7. An apparatus, comprising:
   a first solid state drive (SSD) located on an SSD card, wherein the first SSD has a fixed capacity, has a first form factor, and is not removable from the SSD card wherein the first form factor is a half height, half length (HHHL) form factor or a full height, half length (FHHL) form factor;
   a second SSD located on the SSD card, wherein the second SSD has a second form factor that is different than the first form factor and is removeable from the SSD card and wherein the second form factor is an M.2 form factor, a U.2 form factor, or an mSATA form factor; and
   an adapter located on the SSD card to attach the second SSD to the SSD card, wherein the adapter is configured to couple a physical interface of the SSD card to a physical interface of the second SSD.

8. The apparatus of claim 7, wherein the SSD card includes an application specific integrated circuit (ASIC) configured to control operation of the first SSD and the second SSD.

9. The apparatus of claim 8, wherein the ASIC is configured to support RAID capability for the SSD card and to support the additional capabilities of the second SSD not provided by the first SSD when the second SSD is mounted to the SSD card.

10. The apparatus of claim 7, wherein the second SSD is configured to be replaced with a third SSD having the second form factor in order to adjust a storage capacity of the SSD card.

11. The apparatus of claim 7, wherein the ASIC is configured to back up data from the second SSD to the first SSD prior to replacing the second SSD with a third SSD.

12. The apparatus of claim 7, wherein the ASIC is configured to mirror data content on the second SSD.

13. The apparatus of claim 7, wherein the adapter comprises:
    a first slot to receive the physical interface of the second SSD; and
    a number of additional slots to receive a corresponding number of additional physical interfaces of respective additional SSDs.

14. The apparatus of claim 13, wherein the physical interface of the SSD card is a PCIe physical interface and is compliant with NVMe and SATA protocols.

15. The apparatus of claim 13, wherein the first SSD is located on a first side of the SSD card and the second SSD is located on a second side of the SSD card.

16. A system, comprising:
    a first memory subsystem located on a memory subsystem adapter card, wherein the first memory subsystem has a fixed capacity, a first form factor, and is not removable from the memory subsystem adapter card wherein the first form factor is a half height, half length (HHHL) form factor or a full height, half length (FHHL) form factor;
    an adapter located on the memory subsystem adapter card, wherein the adapter comprises a number of slots by which a number of additional memory subsystems can be removably attached to the memory subsystem adapter card and wherein the second form factor is an M.2 form factor, a U.2 form factor, or an mSATA form factor; and wherein the number of additional memory subsystems have a different form factor than the first form factor.

17. The system of claim 16, further comprising a controller configured to perform added memory subsystem capabilities when the number of additional memory subsystems are attached to the adapter card as compared to when the number of additional memory subsystems are not attached to the adapter card.

18. The system of claim 17, wherein the first memory subsystem and the number of additional memory subsystems comprise solid state drives, and wherein the added memory subsystem capabilities comprise SSD capabilities selected from a group of capabilities that includes:

data backup;
RAID; and
importing of foreign configurations.

* * * * *